H. J. HEIDER.
DRAFT EQUALIZER.
APPLICATION FILED JUNE 20, 1908.
12,909. Reissued Jan. 12, 1909.
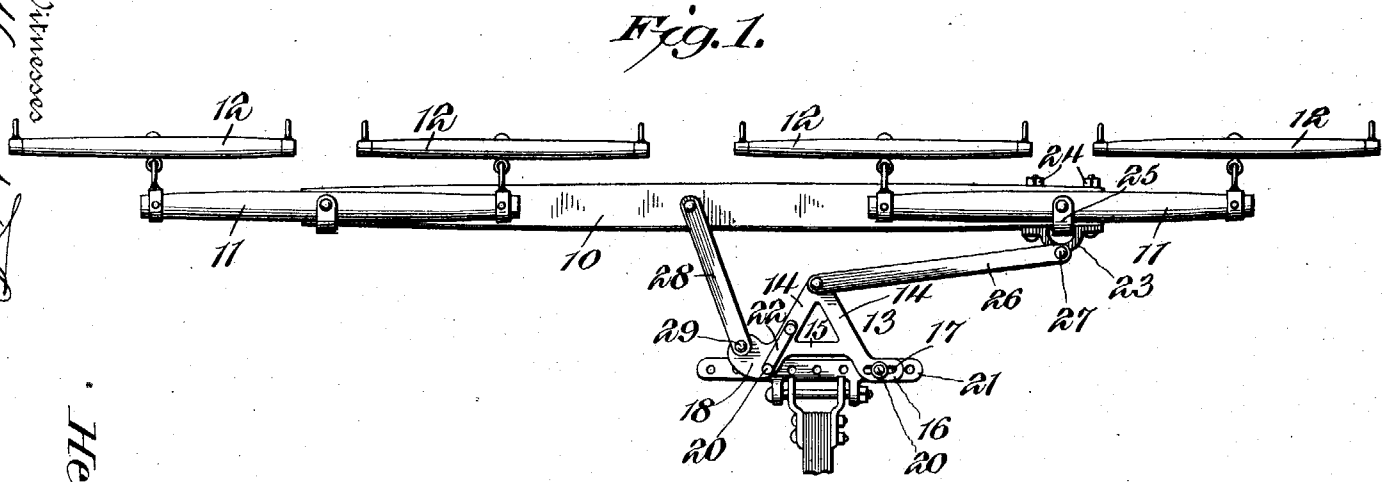
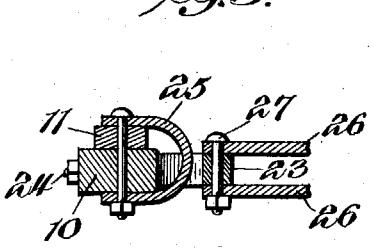
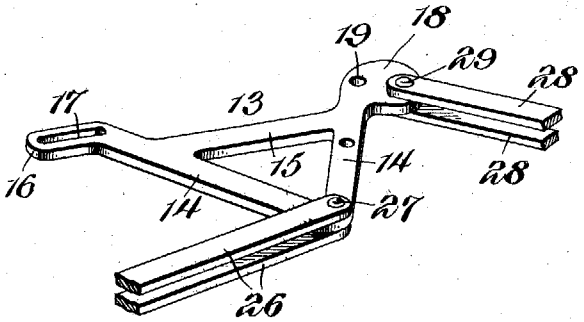
Witnesses
Howard D. Orr.
B. G. Foster
Henry J. Heider, Inventor,
By E. G. Siggers.
Attorney
THE NORRIS PETERS CO., WASHINGTON, D. C.

UNITED STATES PATENT OFFICE.

HENRY J. HEIDER, OF CARROLL, IOWA.

DRAFT-EQUALIZER.

No. 12,909. Specification of Reissued Letters Patent. Reissued Jan. 12, 1909.

Original No. 731,568, dated June 23, 1903, Serial No. 132,642. Application for reissue filed June 20, 1908. Serial No. 439,636.

*To all whom it may concern:*

Be it known that I, HENRY J. HEIDER, a citizen of the United States, residing at Carroll, in the county of Carroll and State of Iowa, have invented a new and useful Draft-Equalizer, of which the following is a specification.

This invention relates more particularly to draft equalizers for use in connection with agricultural implements, especially plows, one of the objects being to provide a structure to which four horses may be hitched, so that one will be in the furrow, while the remainder will travel on unplowed ground. It will be understood, however, that a greater or lesser number of draft animals may be employed.

Another object is to employ a combination of simple elements to obtain the desired ends and to construct the same so that the evener can be readily attached to clevises of different sizes.

The preferred form of construction is shown in the accompanying drawings, wherein:—

Figure 1 is a top plan view of the equalizer. Fig. 2 is a detail perspective view of the bracket frame, and Fig. 3 is a detail sectional view through one end of the draft bar.

Similar reference numerals designate corresponding parts in all the figures of the drawings.

A draft bar 10 is employed that may be of any desired or well known construction and to the ends of which are pivoted whiffletrees 11, carrying the usual swingletrees 12, thereby making connections for four horses. A body piece 13 is also employed, said piece being, preferably, an A-shaped bracket frame comprising converging side arms 14, connected intermediate their ends by a cross bar 15. The free terminal of one of the arms 14 is provided with an offset outstanding ear 16, having a transversely disposed slot 17, while the corresponding end of the other arm is provided with a lug 18, having a bolt-receiving opening 19 therethrough. Through the opening 19 and the slot 17 are passed fastening bolts 20 by means of which the bracket frame can be attached to the clevis, (shown at 21 in Fig. 1). This clevis may be of any well known construction, and as the fastening bolts are relatively movable, because one of them passes through the slot 17, it will be evident that said bolts may be adjusted to suit the positions of the openings in the clevis. A hammer strap 22 can also be employed, if desired, one end being fastened by the bolt 20, the other end being attached to the bracket frame.

A stirrup 23 is secured to one end of the draft bar 10 by means of bolts 24, being located against the rear face of said bar and embracing the clip 25, employed in connecting the whiffletree to the bar. This stirrup is connected by means of a set of links 26 to the apex of the frame 13, said links being secured by pivots, as 27. Another set of links 28 is employed for connecting the lug 18 with the intermediate portion of the draft bar, a pivot 29 serving to fasten the links to said lug. The sets of links are thus disposed in angular relation with respect to themselves and the line of draft, the pivot 27 being arranged in advance of the pivot 29 of the links 28. By this arrangement, the draft bar 10 is fastened to a plow beam with one end nearer the line of draft than the other, so that one horse will travel in the furrow previously made by the plow, while the others will be on unplowed ground. At the same time, no undue side draft is created. The structure is extremely simple, being made up of a few elements that will not easily break or become deranged. Furthermore, it can be applied to almost any clevis now in general use because of the adjustability of the fastening bolts for the bracket frame. It will be noted that the angularly disposed links hold the draft bar against horizontal endwise movement, and yet allow free horizontal swinging movement rearwardly and forwardly, and that they also support the draft bar in fixed horizontal relation to the body piece or bracket frame.

From the foregoing, it is thought that the construction, operation and many advantages of the herein described invention will be apparent to those skilled in the art, without further description, and it will be understood that various changes in the size, shape proportion, and minor details of construction, may be resorted to without departing from the spirit or sacrificing any of the advantages of the invention.

Having thus fully described my invention, what I claim as new, and desire to secure by Letters Patent, is:—

1. In a draft equalizer, the combination with a single rigid draft bar, of whiffletrees connected thereto, a body piece, means for securing the body piece against pivotal movement, and links pivotally connecting the body piece and the draft bar and holding said bar against horizontal endwise movement.

2. In a draft equalizer, the combination with a single rigid draft bar, of whiffletrees connected thereto, a body piece arranged in rear of the draft bar, means for securing the body piece against pivotal movement, and links pivotally connecting the body piece and different portions of the draft bar, said links being disposed in angular relation and holding the draft bar against horizontal endwise movement.

3. In a draft equalizer, the combination with a single rigid draft bar, of whiffletrees connected thereto, a body piece, means for securing the body piece against pivotal movement, and links pivotally connecting the body piece and different portions of the draft bar to hold said bar against horizontal endwise movement, said links being disposed in angular relation with respect to themselves and the line of draft and also constituting supports for the draft bar.

4. In a draft equalizer, the combination with a draft bar, of whiffletrees connected thereto, a body bracket, fastening devices adjustable toward and from each other upon the bracket for securing the bracket against horizontal movement and at separated points, and divergent links attached to the draft bar and connected to the body bracket at separated points, thereby holding the draft bar against horizontal endwise movement.

5. In a draft equalizer, the combination with a draft bar, of a body bracket having bolt openings and a transversely disposed slot, fastening bolts passing through the openings and the slot, and links pivotally connected to the bracket and the draft bar.

6. In a draft equalizer, the combination with a draft bar, of a substantially A-shaped bracket frame, means for securing the terminals of the frame to a plow or other clevis, a stirrup attached to the rear face of the draft bar contiguous to one end, and sets of links secured to the bracket frame, one of said sets being connected to the stirrup.

7. In combination with the clevis, the bracket frame adjustably mounted at one side of and along the same, the whiffletrees, the draft bar, and loose connections between the draft bar and the bracket frame, said connections being arranged at an angle to each other and attached to the bracket frame one in advance of the other.

HENRY J. HEIDER.

Witnesses:
A. E. BRYAN,
J. C. HEIDER.